United States Patent
Ho et al.

(10) Patent No.: US 7,377,208 B2
(45) Date of Patent: May 27, 2008

(54) COOKING PAN WITH TEMPERATURE DISPLAY

(75) Inventors: Waiming Ho, Hong Kong (CN); Ming Lee, Hong Kong (CN)

(73) Assignee: Mingle Metal (Shen Zhen) Co. Limited, Shenzhen (CN)

( * ) Notice: Subject to any disclaimer, the term of this patent is extended or adjusted under 35 U.S.C. 154(b) by 0 days.

(21) Appl. No.: 11/278,005

(22) Filed: Mar. 30, 2006

(65) Prior Publication Data
US 2007/0012199 A1    Jan. 18, 2007

(30) Foreign Application Priority Data
Jul. 18, 2005    (CN) .................. 2005 2 0113972 U

(51) Int. Cl.
*A47J 27/00*    (2006.01)
(52) U.S. Cl. .......................... 99/342; 99/422; 374/141; 374/180
(58) Field of Classification Search .......... 99/342–344, 99/422–425; 374/141, 142, 179, 180, 149
See application file for complete search history.

(56) References Cited

U.S. PATENT DOCUMENTS

| | | | |
|---|---|---|---|
| 2,750,916 A | * | 6/1956 | Hanington .................. 116/102 |
| 5,441,344 A | * | 8/1995 | Cook, III ..................... 374/141 |
| 6,206,564 B1 | * | 3/2001 | Adamczewski ............. 374/141 |

* cited by examiner

*Primary Examiner*—Timothy F. Simone
(74) *Attorney, Agent, or Firm*—Buchanan Ingersoll & Rooney PC

(57) ABSTRACT

A cooking pan with a temperature display function includes a pan body and a handle. An extra bottom layer is provided at a bottom of the pan body with a metallic plate sandwiched in between the bottom of the pan body and the extra bottom layer. An installation hole is located at a side of the metallic plate with a temperature sensor installed inside the hole. A display unit is placed on the handle and the temperature sensor is connected to the display unit via connection wires. This cooking pan can show the temperature of the bottom of the pan body precisely and quickly, so that the user can control the timing better.

8 Claims, 2 Drawing Sheets

COOKING PAN WITH TEMPERATURE DISPLAY

CROSS-REFERENCE TO RELATED APPLICATIONS

This application claims the benefit of Chinese application CN200520113972.8 filed on Jul. 18, 2005, which is entirely incorporated by reference.

FIELD OF THE INVENTION

The invention relates to a cooking tool, especially a cooking pan with a temperature display.

BACKGROUND OF THE INVENTION

Nowadays cooking pans are commonly used for preparing meals such as drying, deep-frying, stewing etc. Many cooking pans comprise a metallic plate having a certain thickness, which is embedded between cooking surface and pan bottom. Such cooking pans do not include a temperature display unit therefore users have to control the heating e.g. cooking time, frequency of slipping and amount of heat based on their experience. However it may lead to overcooking or undercooking.

SUMMARY

To overcome the above defects of the existing cooking pans, the invention provides a user-friendly cooking pan with a temperature display unit.

To achieve the above goal, the invention provides a cooking pan with a temperature display comprising a pan body and a handle. An extra bottom layer is formed at a bottom of the pan body with a metallic plate between the bottom of the pan body and the extra bottom layer. A temperature sensor is placed in the metallic plate. The handle has a display unit. The temperature sensor is connected with the display unit via connection wires.

An installation hole extends from a side of the metallic plate in the direction of thickness to a center of the metallic plate. The temperature sensor is placed at an end of the installation hole. The temperature sensor is linked to the display unit with connection wires through a side-wall of the extra bottom layer.

The installation hole extends inward to a position of about ⅓ to ⅔ of the distance away from the center of the metallic plate.

The installation hole is located below the handle.

The temperature sensor and the connection wires are placed inside a protection tube. This protection tube extends to the handle along with the connection wires.

The temperature sensor and the protection tube are in firm contact with the bottom of the pan body.

The temperature sensor and its protection tube are in good thermal contact. The protection tube, the pan body and the metallic plate are in good thermal contact.

The temperature sensor is high temperature sustainable. The protection tube is a high temperature sustainable and impact proof metallic tube. The temperature sensor and connection wires are electrically insulated from the protection tube.

The metallic protection tube is sealed in itself. The protection tube and the metallic plate are sealed therebetween. A portion of the protection tube located inside the metallic plate has a smaller diameter, and a portion of the protection tube outside the metallic plate has a larger diameter.

The display unit is located on the top surface of the handle. Said display unit may be either LCD digital display or LED display.

Since the metallic plate has a certain thickness, an installation hole is placed on the side of the metallic plate with high temperature sustainable sensor installed at the end of the installation hole. This sensor detects the temperature of the pan while being used and displays the temperature quickly and precisely through the display unit, so that the users may control the timing better during cooking.

DETAILED DESCRIPTION OF THE PREFERRED EMBODIMENTS

The embodiments of the present invention will now be described with reference to the drawings.

Figure 1:
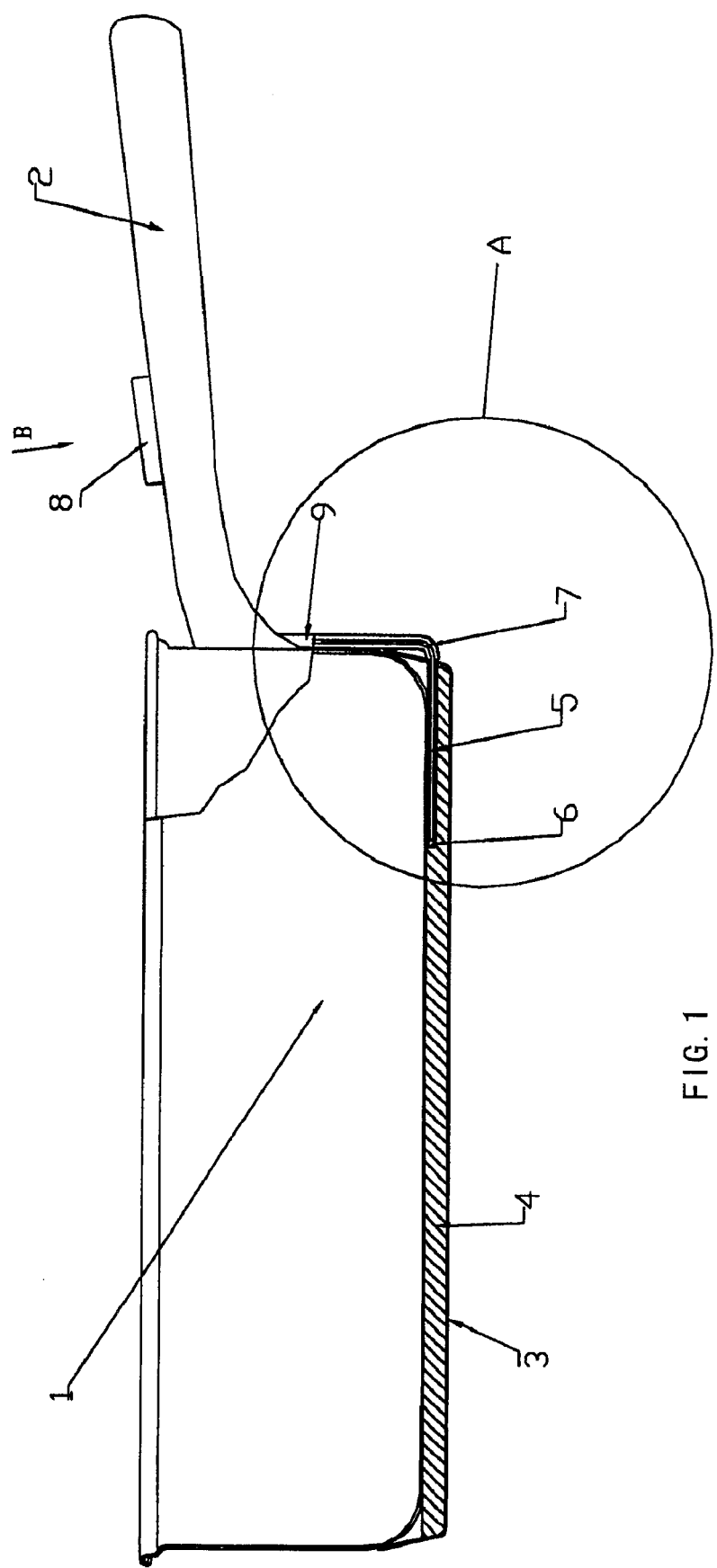
FIG. 1 is a sectional view of the present cooking pan with temperature display function.
Figure 3:
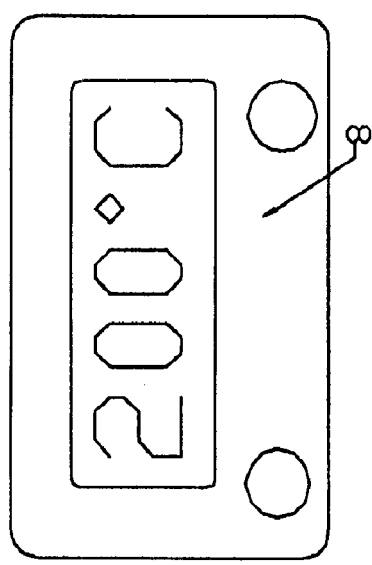
FIG. 3 is a schematic view of a display unit in the direction of arrow B in FIG. 1.
Figure 2:
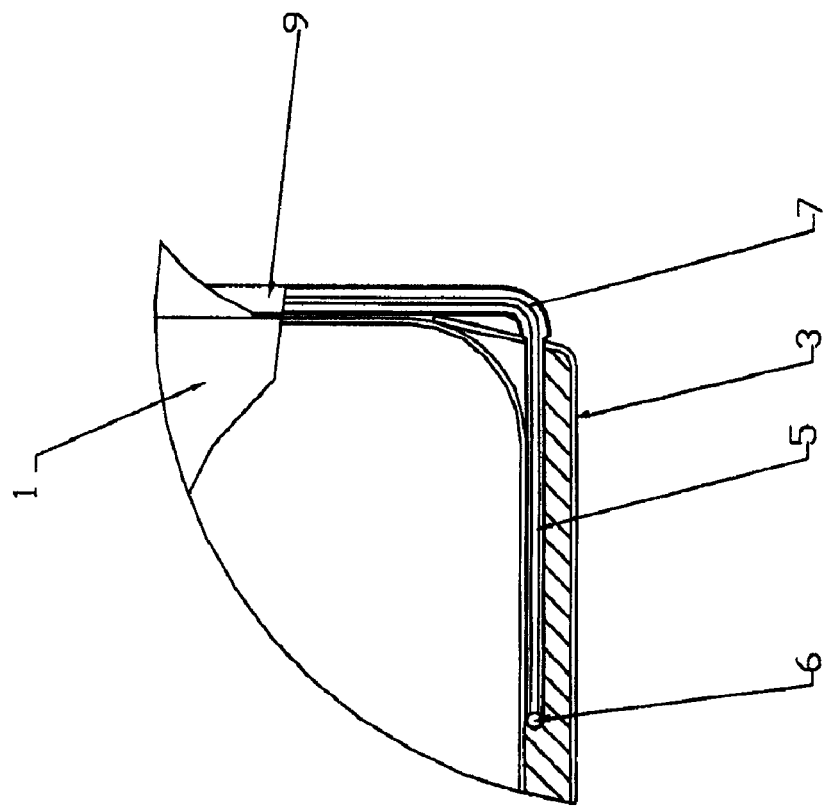
FIG. 2 is an enlarged view of section A in FIG. 1.

Referring to FIG. 1 and FIG. 2, a handle 2 is installed on a side of pan body 1. An extra bottom layer 3 is constructed at a bottom of pan body 1. A metallic plate 4 is sandwiched in between the bottom of the pan body 1 and the extra bottom layer 3. An installation hole 5 is located below the handle 2 on the side of the metallic plate 4. This installation hole 5 is extending to about ½ of the distance toward a center of the metallic plate 4. Although the ideal position is that the installation hole 5 is extended to the center of the metallic plate 4, however, since the metallic plate 4 has good heat conductivity, the installation hole 5 is extended inward to a position of ⅓ to ⅔ of the distance from the center of the metallic plate 4 under normal circumstances considering the need for installation and fabrication. The high temperature sustainable temperature sensor 6 is placed at the end of the installation hole 5. Its connection wires 7 links the display unit 8 on handle 2 through a side wall of the extra bottom layer 3. The display unit 8 is located on handle 2 near the pan body 1. In order to protect the connection wires 7 and the temperature sensor 6, a protection tube 9 is used to enclose the temperature sensor 6 and the connection wires 7. This protection tube 9 is extended to handle 2.

The invention is not solely limited to the above embodiment. Any modifications, obvious to those skilled in the art, can be made thereto without departing from the concept of the present invention. For example, the display unit can be placed at different location of the handle due to the need of the outlook design. Any cooking pan with a temperature sensor is placed inside a metallic plate displaying temperature via a display unit, are protected under the present invention's patent rights.

The invention claimed is:

1. A cooking pan with a temperature display, comprising a pan body, a bottom of the pan body, a handle, a display unit located on the handle, an extra bottom layer formed at the bottom of the pan body with a metallic plate sandwiched in between the bottom of the pan body and the extra bottom layer, and a temperature sensor placed inside the metallic plate, which temperature sensor is connected with the display unit located on the handle via connection wires, wherein said metallic plate includes an installation hole extending from an edge of the metallic plate toward a center of the metallic plate to a position of about ⅓ to ⅔ of a distance from the center of the metallic plate, said temperature sensor is placed at the end of the installation hole, and said connection wires are passed through a side wall of the extra bottom layer and are connected to the display unit.

2. The cooking pan with a temperature display as claimed in claim 1, wherein said installation hole is located below the handle.

3. The cooking pan with a temperature display as claimed in claim 1, wherein said temperature sensor and the connection wires are placed inside a protection tube extending to the handle along with the connection wires.

4. The cooking pan with a temperature display as claimed in claim 3, wherein said temperature sensor and the protection tube are in firm contact with the bottom of the pan body.

5. The cooking pan with a temperature display as claimed in claim 4, wherein said temperature sensor and its protection tube are in good thermal contact, and the protection tube, the pan body and the metallic plate are in good thermal contact.

6. The cooking pan with a temperature display as claimed in claim 5, wherein said temperature sensor is high temperature sustainable, and said protection tube is a high temperature sustainable and impact proof metallic tube, and the temperature sensor and connection wires are electrically insulated from the protection tube.

7. The cooking pan with a temperature display as claimed in claim 6, wherein said metallic protection tube is sealed, and the protection tube and the metallic plate are sealed together; wherein a portion of the protection tube located inside the metallic plate has a smaller diameter, and a portion of the protection tube outside the metallic plate has a larger diameter.

8. The cooking pan with a temperature display as claimed in claim 1, wherein the display unit is located on a top surface of the handle, and said display unit may be either LCD digital display or LED display.

\* \* \* \* \*